United States Patent [19]

Solgaard et al.

[11] Patent Number: 5,155,617
[45] Date of Patent: Oct. 13, 1992

[54] ELECTRO-OPTIC ATTENUATED TOTAL INTERNAL REFLECTION MODULATOR AND METHOD

[75] Inventors: Olav Solgaard, Palo Alto; John I. Thackara, Sunnyvale, both of Calif.

[73] Assignee: The Board of Trustees of the Leland Stanford Junior University, Stanford, Calif.

[21] Appl. No.: 714,571

[22] Filed: Jun. 13, 1991

[51] Int. Cl.[5] .......................... G02F 1/03; G02F 1/01
[52] U.S. Cl. .................................. 359/245; 359/263; 359/276; 359/247
[58] Field of Search ............... 359/245, 263, 276, 247, 359/248, 250, 254

[56] References Cited

U.S. PATENT DOCUMENTS

| 4,451,123 | 5/1984 | McNeill et al. | 359/276 |
| 4,948,225 | 8/1990 | Rider et al. | 359/245 |
| 5,075,796 | 12/1991 | Schildkraut et al. | 359/247 |

FOREIGN PATENT DOCUMENTS 0254405  10/1990  Japan ................................. 359/245

OTHER PUBLICATIONS

Schildkraut, J. S.; "Long-range surface plasmon electroptic modulator", Applied Optics (1988) Nov. 1, No. 21 vol. 27 p. 4587+.

*Primary Examiner*—Eugene R. LaRoche
*Assistant Examiner*—Evelyn A. Lester
*Attorney, Agent, or Firm*—Rosenblum Parish & Isaacs

[57] ABSTRACT

Method and apparatus for electro-optically modulating the intensity of an incident light beam including a coupling prism with a high reflective index, a semiconductor substrate in optical contact with the coupling prism and having a conductive area formed therein, an organic electro-optic film formed on the substrate and covering at least a portion of the conductive area, and a transmission line disposed above the electro-optic film and cooperating with the conductive area to form electrodes for use in applying an electric field across the electro-optic film. Light directed through the substrate by the coupling prism couples with surface plasmons at the film-to-metal interface and is selectively reflected or absorbed depending upon whether or not an electric field is applied.

12 Claims, 5 Drawing Sheets

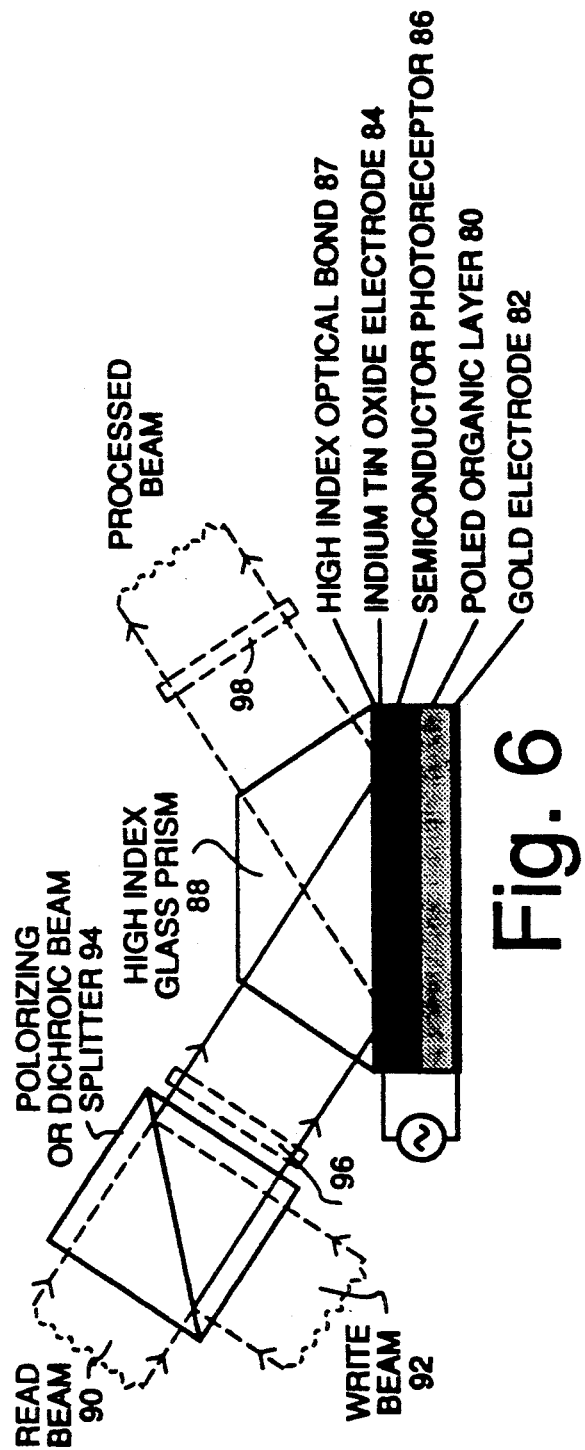

ELECTRO-OPTIC ATTENUATED TOTAL INTERNAL REFLECTION MODULATOR AND METHOD

BACKGROUND OF THE INVENTION

1. Field of the Invention

The present invention relates generally to a method and apparatus for modulating the amplitude or intensity of a light beam, and more particularly to an electro-optic attenuated total internal reflection modulator and method for amplitude modulating light from narrow-band light sources like lasers and light-emitting diodes (LEDs). The bandwidth of the modulation ranges from DC to microwave frequencies (beyond 100 GHz), and the concept is applicable to all narrow-band sources in the optical spectrum. The modulation can be analog or digital, small signal or large signal depending on the application.

2. Brief Description of the Prior Art

Heretofore, electro-optic materials have been used in various types of light-modulating apparatus. See, for example, "High-Speed Optical Modulator for Application in Instrumentation" by R. L. Jungerman et al., *Journal of Lightwave Technology*, Volume VIII, No. 9, pages 1363–1370 (Sep. 1990); "Surface Plasmon Spatial Light Modulators", by E. M. Yeatman et al., S.P.I.E., Volume 1151, pages 522–532, *Optical Information Processing Systems and Architectures* (1989); "Surface Plasmon Enhanced Intersubband Resonance in AlGaAs QWs" by M. J. Cain et al., *S.P.I.E.*, Volume 861, pages 82–85, *Quantum Wells and Super Lattices in Opto-Electronic Devices and Integrated Optics* (1987); U.S. Patent to R. T. Collins et al. U.S. Pat. No. 4,915,482 entitled "Optical Modulator".

Moreover, organic electro-optic (E-O) materials have been the subject of increasing study for over fifteen years. Such organic materials can exhibit extremely large broad-band electro-optical response while maintaining a low dielectric constant from DC through the visible range. These materials may currently be classified into four subgroups: crystalline, cross-linked polymers, pendant side-chain polymers, and guest-host systems. In all four subgroups the origin of the E-O response lies in the asymmetric electronic structure of the nonlinear optic (NLO) molecular units. In order for the bulk of the material to exhibit an electro-optic response, the NLO units must comprise a noncentrosymmetric structure.

Some NLO molecules form naturally into noncentrosymmetric crystals and make up the first subgroup. The remaining three subgroups also employ NLO molecular units but, while still having a noncentrosymmetric structure, do not possess any crystalline order. They differ from each other in the number of covalent bonds per NLO unit that exist between the unit and either an optically inactive support material or other NLO units. Cross-linked polymers, pendant side-chain polymers and guest-host materials possess two, one and no covalent bonds to the NLO units respectively. Unlike the crystalline materials, these three types of organic E-O materials do not usually form naturally into noncentrosymmetric structures. After forming them into the desired geometry, an additional processing step is required to partially orient the NLO units and create a bulk noncentrosymmetric structure. However, the relative ease in which the noncrystalline materials can be fabricated into device architectures more than makes up for the additional processing step required.

The orientation of the NLO units is referred to as poling. A poling operation usually involves heating the organic layer to a temperature near or above its glass transition temperature where the NLO units become partially mobile. A strong electric field is then applied either by electrodes adjacent to the layer or by using a corona discharge to deposit electrons on one side of the organic layer. The electric field exerts a torque on the NLO units which by virtue of their asymmetric electronic structure possess large dipole moments. After the NLO units have partially aligned with the electric field as a result of the induced torque, the temperature is reduced back to ambient with the field still applied to freeze in the partial alignment. The resulting material then has a noncentrosymmetric structure and exhibits a linear E-O response. Noncrystalline organic E-O materials can be processed at temperatures compatible with many integrated circuit technologies and can be formed into many quality thin films making them particularly useful in integrated optic and optical modulator applications.

The magnitude of the electro-optic effect is a function of the wavelength of the light being modulated. This dependence on wavelength is strongest when the wavelength is close to the excitation energy of the NLO units. Experimental data on 2-methyl-4-nitroaniline (MNA) indicates that at least 5-fold increases in the electro-optic response can be achieved by operating near the excitation wavelength. The drawback to operating at wavelengths near the excitation wavelength is that the optical absorption of the organic material also rises rapidly in this wavelength region. In most modulator geometries, a large increase in the optical absorption of the active layer results in an unacceptable reduction in the amount of light that the modulator transmits.

However, it has been found that, if a particular thickness of poled organic film of the type described above is interfaced to a metal layer to form a light reflecting device, the photons of an incoming light beam intercepting the device at a specific angle will be phase-matched to surface plasmons at the film-to-metal interface, and the resonant coupling of energy from the light beam will result in a sharp minimum of reflectance. But since the phase-match angle is dependant on the relative dielectric constant of the organic material, and such constant can be changed by the application of an electric field across the film, it follows that one can influence the reflectance of, and then modulate the intensity of the reflected beam by changing the applied electric field. This modulator geometry can operate effectively even if the organic film has high optical absorption ($>200$ cm$^{-1}$).

SUMMARY OF THE PRESENT INVENTION

It is therefore an object of the present invention to utilize materials of the type described above to provide a novel light modulation apparatus and method for amplitude modulating light from narrow-band light sources like lasers and light-emitting diodes.

Another object of the present invention is to provide an electro-optic modulator and method of the type described above wherein the bandwidth of the modulation ranges from DC to microwave frequencies and is applicable to all narrow-band sources in the optical spectrum.

Still another object of the present invention is to provide a device and method of the type described above which can produce modulation that is analog or digital, small signal or large signal depending on the application.

Briefly, a preferred embodiment of the present invention includes a coupling prism with a high refractive index, a semiconductor substrate in optical contact with the coupling prism and having a conductive area formed therein, an organic electro-optic film formed on the substrate and covering at least a portion of the conductive area, and a transmission line disposed above the electro-optic film and cooperating with the conductive area to form electrodes for use in applying an electric field across the electro-optic film. Light directed through the substrate by the coupling prism couples with surface plasmons at the film-to-metal interface and is selectively reflected or absorbed depending upon whether or not an electric field is applied.

A principal advantage of the present invention is that the critical coupling to surface plasmons in the modulator represents an amplification of the electro-optic effect, i.e. the light intensity changes from substantially 100% to 0 for a change in optical thickness of the electro-optic film of much less than one-half wavelength.

Another advantage of the present invention is that there are no phase match conditions of the optical and electrical waves that have to be met.

Still another advantage of the present invention is that coupling losses to and from optical fibers leading to and from the device are reduced because optical waveguides are not used.

A consequential advantage of the present invention is that devices made in accordance therewith will have higher bandwidth and lower insertion loss than state-of-the-art travelling wave modulators.

These and other objects and advantages of the present invention will no doubt become apparent to those skilled in the art after having read the following detailed description of the preferred embodiments as illustrated in the several figures of the drawing.

IN THE DRAWING

FIG. 6 is a diagram showing a spatial light modulator employing the principles of the present invention.

DETAILED DESCRIPTION OF THE PREFERRED EMBODIMENTS

Figure 1:
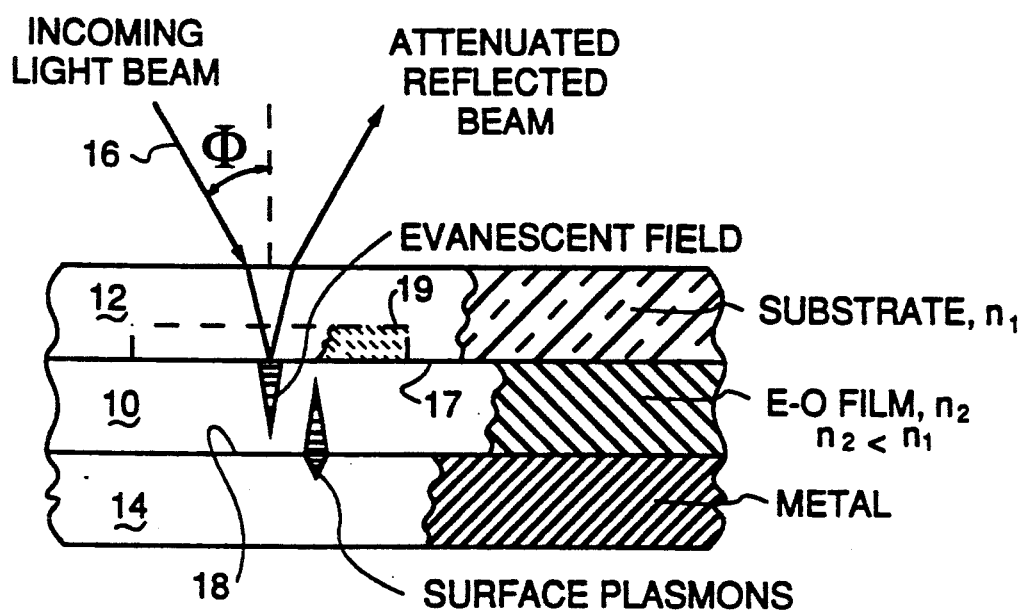
FIG. 1 is a diagram schematically illustrating the underlying operating principles of the present invention.

Referring now to FIG. 1 of the drawing, the principle of attenuated total internal reflection (ATR) through a coupling of photons to surface plasmons is illustrated. In the illustrated structure, an electro-optic (E-D) film 10 is sandwiched between a light transparent substrate 12 and a metal layer 14. At a specific angle $\phi$ (the phase-match angle) the photons of an incoming light beam 16 will be phase-matched to the surface plasmons on the film-to-metal interface 18. The phase-match angle is approximately given by the expression $$\phi = \arcsin \frac{\epsilon_f \epsilon_m}{\epsilon_s(\epsilon_f + \epsilon_m)}$$

wherein "$\epsilon$" is the relative dielectric constant and the subscripts "f", "m" and "s" refer to the electro-optic film, the metal and the substrate respectively. If the film 10 has the correct thickness (the critical thickness), the energy of photons in the light beam couples into surface plasmons and little if any light is externally reflected. For organic materials this thickness is approximately 1.5 microns.

By applying an electric field across the E-O film 10 the refractive index of the film (the dielectric constant is the square of the refractive index) and the phase-match angle will be changed. Since the reflection of an incident light beam close to the phase-match angle will change drastically when the phase-match angle changes, the reflected optical beam will thus be modulated by the electric field. One way of providing means for applying an electric field across the film 10 is to diffuse an excess of n type impurities into a region 19 of the surface of substrate 12 to form a transparent conductive electrode which can be used in combination with metal layer 14 to apply the desired field.

Figure 2:
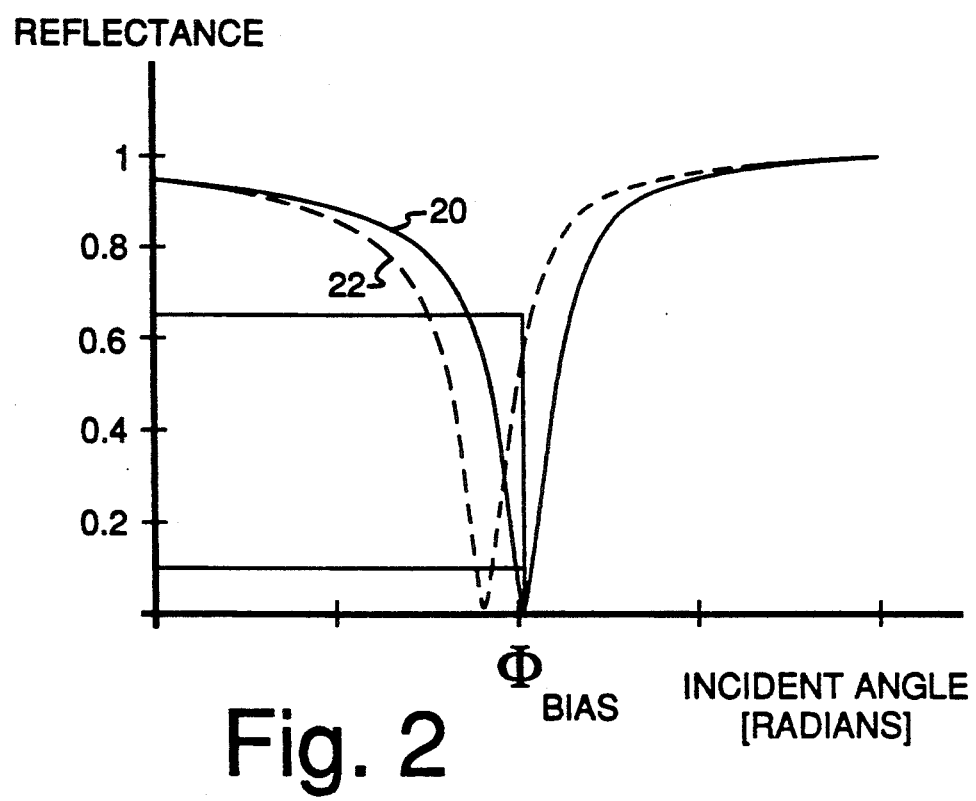
FIG. 2 is a diagram illustrating reflection as a function of incident angles when both phase-matching and the resonant condition for coupling to surface plasmons are fulfilled in accordance with the present invention.

More specifically, the resonant coupling of energy from the light beam 16 at the phase-match angle results in a sharp minimum of the reflected light at this angle, as depicted in FIG. 2 of the drawing which schematically illustrates reflection as a function of incident angle when both the phase-matching and the resonant condition for coupling to surface plasmons are fulfilled. The solid line 20 and dashed line 22 show the reflectance with and without an applied field. At the angle $\phi_{bias}$ the reflectance is strongly dependent on the field. The phase-match angle depends on the relative dielectric constant ($\epsilon_f$) as shown in the above formula.

Figure 3:
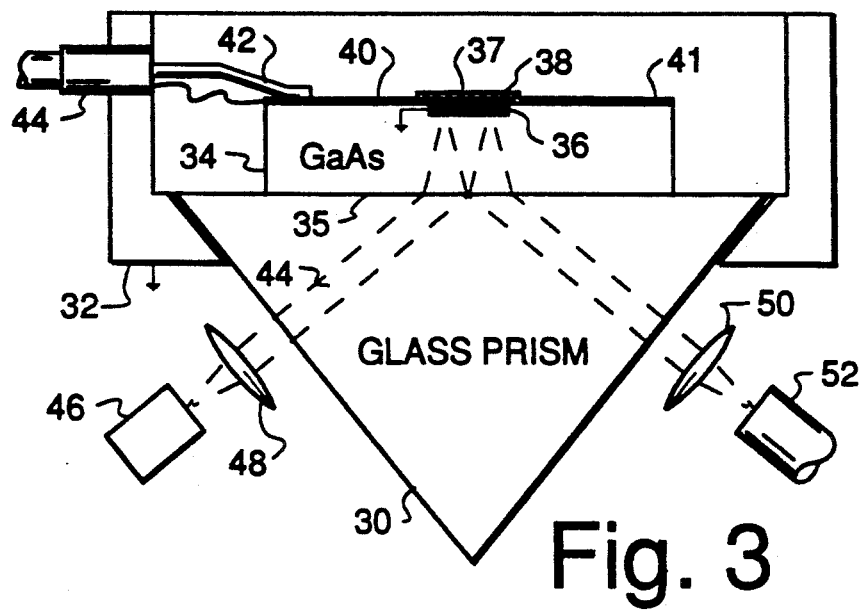
FIGS. 3 and 4 are respectively cross-sectional and partial top views of a preferred embodiment of the present invention.
Figure 4:
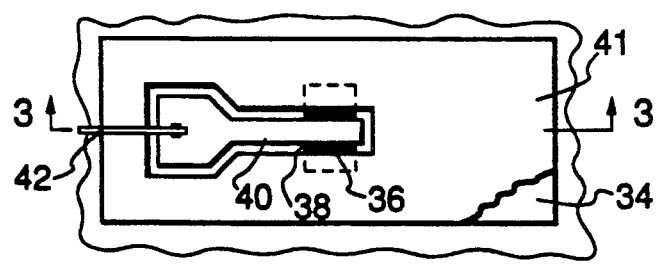

A practical realization of an electro-optic attenuated total internal reflection (ATR) modulator in accordance with the present invention is depicted in FIG. 3 and includes a coupling prism 30 having a high refractive index supported within a suitable modulator package 32. Affixed to the top of prism 30 is a semiconductor substrate 34 of a material that is selected to have low loss at the optical wavelengths involved. Substrate 34 is in optical contact with the upper surface 35 of prism 30 and the junction therebetween is matched with an index-matching fluid (not shown). The semiconductor substrate, which in the preferred embodiment is formed of Galium Arsenide (GaAs), has a conductive area 36 formed beneath the upper surface thereof to serve as one of the electrodes used to apply an electric field across a layer of electro-optic film 38 deposited thereover. Also formed on the upper surface of substrate 34 and extending across the top of E-O film 38 is an elongated strip of conductive material 40 forming the signal conduct of a transmission line used to provide a high-frequency electrical drive signal to the device. A separate conductive area 41 forms the ground plane of the transmission line and is connected to the lower electrode 36. As is perhaps better illustrated in FIG. 4, the signal conductor 40 passes over the electro-optic film 38 simultaneously acting as an upper electrode and a means for supplying the metal film necessary for surface plasmon propagation. Note that, as compared to FIG. 1, the relative positions of substrate, E-O film and metal are inverted. The film material 38 must have a high electro-optic coefficient but, as was pointed out above, need not have a low-loss characteristic.

Affixed to one end of conductor 40 is the center conductor 42 of a coaxial transmission line connector 44. Conductor 41 is connected to the ground conductor of coaxial connector 44. The transmission line formed by conductors 40 and 41 can be terminated in its characteristic impedance off or on substrate 34 or can end in an open at the modulator. Terminated geometries will achieve higher speed (the effective series resistance is half the value of the characteristic impedance of the transmission line) while an open at the modulator doubles the applied voltage.

As will be appreciated by those skilled in the art, a laser beam 44 generated by a laser source 46 and then expanded and recollimated by an appropriate lens system 48 will pass through an input side of prism 30, be refracted at the interface 35, pass through substrate 34 and electrode region 36, and be reflected at the interface 37 to the electro-optic layer 38, again refracted at interface 35 and then passed through prism 30 to an outlet face where it can be refocused by a suitable lens system 50 onto an optical fiber 52 or other detector or transmission medium. However, if the incidence angle is the critical value, substantially all of the light reaching interface 37 will be absorbed, and it will only be reflected when an electric field is applied by input of an electrical voltage on conductor 40.

In a demonstration prototype the substrate was formed of a silicon prism with AR-coated entrance and exit faces. The prism was mated to the surface of a glass flat with a 1500 Å gold (Au) film and a 1.33 μm organic electro-optic layer. The organic electro-optic film was 10% by weight of disperse red 1 (DR1) in polycyclohexylmethacrylate (PCMA), poled at 50 V/μm normal to the film. With this setup, 30% modulation of the reflected beam was achieved with 3.5 dB insertion loss in a 450 kHz bandwith, with a drive voltage of 32 Vrms. The bandwidth was limited by the RC time constant of the electrical circuit. The capacitance was 2 nF/cm$^2$ with an area of 2 cm$^2$. Much higher modulation efficiency can be expected with films of higher electro-optic coefficients and the bandwidth can be easily extended to higher frequencies by reducing the area of the modulator.

The critical coupling to surface plasmons in the ATR modulator represents an amplification of the electro-optic effect (i.e., the light intensity changes from 100% to 0% for a change in the optical thickness of the film of much less than one-half wavelength). Other modulators (like Fabry-Perot modulators and waveguide modulators) use long interaction lengths to achieve the same enhancement. Unlike the present ATR modulator, these long interaction length modulators cannot use electro-optic materials with high loss because the insertion loss becomes too large. For high frequency operation, travelling wave modulators thus represent the present state of the art. Besides the possibility of using high loss materials, the present ATR modulator has the advantages (compared to the travelling wave class of modulators) that
1) There is no phase match condition of the optical and electrical waves that has to be met; and
2) Coupling losses to and from optical fibers will be reduced because optical waveguides are not used.

In practical terms this means that the subject ATR modulator will have higher bandwidth and lower insertion loss than travelling wave modulators.

Figure 5:
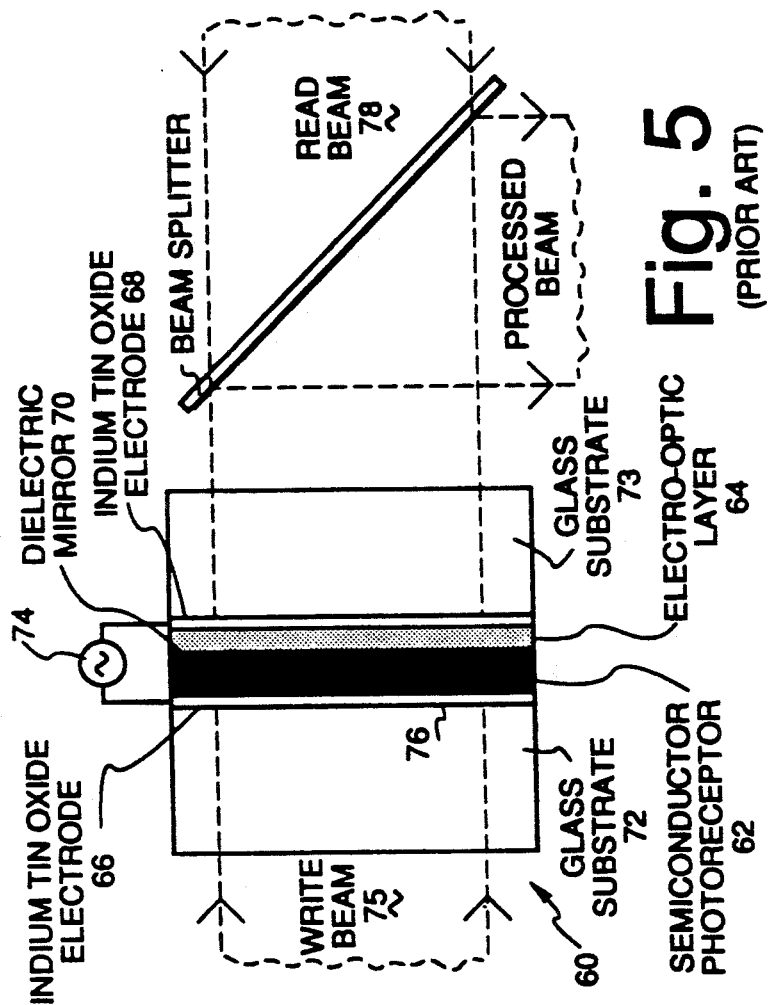
FIG. 5 is a diagram illustrating for comparative purposes a prior art spatial light modulator.

The ATR modulator geometry of the present invention is also well suited for use in spatial light modulator (SLM) applications. By way of background a basic prior art photo-addressed SLM geometry is shown in FIG. 5. The photo-addressed liquid crystal SLM, one of the leading SLM technologies, includes as a component part an architecture similar to that of FIG. 1. More specifically, the device 60 is comprised of a photo-receptor 62 and an electro-optic layer 64 sandwiched between two plane optically transparent electrodes 66 and 68. A dielectric mirror 70 is usually employed and is deposited on the back side of the photo-receptor 62. The entire structure is bonded between glass substrates 72 and 73 for structural support.

In operation a voltage is applied by a source 74 to electrodes 66 and 68 creating an electric field across the photo-receptor and E-O layers, and divides capacitively between them. The electric field in the photo-receptor 62 must be sufficient to fully deplete it, i.e., it must be sufficient to remove all charge carriers from the bulk of the photo-receptor. The electron-hole pairs, generated near the photo-receptor surface by the optical write image of the write beam 75, are separated by the fields within the photo-receptor. Depending upon the polarity of the field, either electrons or holes drift across the photo-receptor and build up at the photo-receptor-dielectric mirror interface 76. The magnitude of the resulting two-dimensional charge pattern is proportional to the spatially varying write beam intensity. The charge pattern at the interface 76 creates a spatially varying electric field across the E-O layer which modulates the phase or amplitude of the optical read beam 78 via an electro-optic effect similar to that discussed above.

SLMs of this type are usually operated in a framed mode in which the charge pattern is allowed to build up for a period of time before the image is read out. The voltage across the modulator is then reduced to zero, or reversed in some cases, which removes the charge pattern from the interface and resets the modulator for the next write-read cycle.

An SLM geometry incorporating the ATR modulator concept of the present invention is shown in FIG. 6 and is comprised of the same types of semiconductor poled organic and gold layers 80 and 82 used in the previously described one-dimensional ATR modulator. To form the SLM a plane indium tin oxide (ITO) electrode 84 is deposited on the front side of the semiconductor layer 86, which now also serves as the photo-receptor. The combination of layers is bonded at 87 to a high-index prism 88 which acts as a substrate as well as the medium that refracts the read beam 90 into the semiconductor at the proper angle for ATR operation.

The write beam 92, which must have a wavelength short enough to generate electron-hole pairs in the photo-receptor 86, is directed by means of a polarizing or dichroic beam splitter 94 onto the photo-receptor along the same optical path as the read beam. The means of a polarizing or dichroic beam splitter further provides alternate projection of the write and read beams through the prism and into the substrate. This prevents lateral distortion of the write and read beams, which are present in the plane of the photo-receptor due to its off axis illumination, from appearing on the processed image.

An input lens system 96 that focuses the write image onto the skewed photo-receptor and an output lens system 98 that images the processed beam to an image plane normal to the output optical axis would be used with the ATR SLM in most applications. The ATR SLM geometry could be operated in the same frame mode described above, and the processed image would be amplitude-modulated in proportion to the write beam intensity. Depending on which side of the reflection curve the modulator was biased, the output image would have either positive or negative contrast, an advantage in some image processing applications. The ATR SLM takes full advantage of the large increase in voltage sensitivity resulting from the ATR effect. Voltage across the poled organic layer is proportional to the write beam intensity. The ATR SLM is able to achieve greater sensitivities and greater operating speeds than the conventional SLM geometry shown in FIG. 5.

As a still further application of the present invention, instead of utilizing a free space propagating incident light beam, a single mode waveguide could be manufactured in the substrate. A section of the waveguide would have a metal film separated from the core by an electro-optic cladding of correct thickness. In this region the waveguide mode would couple to the glossy surface plasmon mode. The coupling will depend critically on the refractive index of the cladding, and the attenuation of the fundamental waveguide mode will therefore be modulated by an electric field that changes the cladding refractive index.

Although the present invention has been described above in terms of a preferred embodiment and several alternative embodiments have been depicted and/or suggested, it is understood that additional applications of the invention will no doubt become apparent to those skilled in the art after having read the above disclosure. For example, the combination of prism 30 and substrate 34 in the embodiment of FIG. 3 could be replaced with a single substrate, the bottom surfaces of which are appropriately angled to form a monolithically integrated prism coupler. It is therefore intended that the appended claims be interpreted to cover all alterations, modifications and adaptations as fall within the true spirit and scope of the application.

What is claimed is:

1. An electro-optic attenuated total reflection modulator apparatus comprising:
   substrate means having a first conductive electrode formed at one planar surface thereof;
   a layer of organic electro-optic material disposed on a planar surface of said substrate means;
   means forming a metallic second conductive electrode disposed on the surface of said layer of electro-optic material opposite that facing said substrate, whereby surface plasmons are produced due to the electro optic material-to-metallic electrode interface; and
   means for projecting a beam of light at a predetermined angle through said substrate and said first electrode onto the interface to said layer of electro-optic material, said predetermined angle being that angle at which the photons in the incoming light beam are phase-matched to the surface plasmons on the electro-optic material-to-metallic electrode interface, whereby when a first potential is caused to appear between said first and second electrodes, the light beam will be substantially attenuated, and when a second electrical potential is caused to appear between said first and second electrodes, the light beam will be substantially reflected.

2. An electro-optic attenuated total reflection modulator apparatus as recited in claim 1 and further comprising a high-index optical prism optically coupled to a planar surface of said substrate means opposite said interface to said layer of electro-optic material for coupling said beam into said substrate means.

3. An electro-optic attenuated total reflection modulator apparatus as recited in claim 1 wherein said substrate means is of a semiconductive material and said first conductive electrode is formed in a surface portion thereof doped with an impurity which causes it to become conductive.

4. An electro-optic attenuated total reflection modulator apparatus as recited in claim 1 wherein said substrate means is comprised of a semiconductor photo-receptor and said first electrode is a layer of Indium tin oxide.

5. An electro-optic attenuated total reflection modulator apparatus as recited in claim 4 and further comprising a high-index optical prism optically coupled to a planar surface of said substrate means opposite said interface to said layer of electro-optic material for coupling said beam into said substrate means.

6. An electro-optic attenuated total reflection modulator apparatus as recited in claim 5 and further comprising means for alternately projecting read and write beams through said prism and into said substrate means.

7. An electro-optic attenuated total reflection modulator apparatus as recited in claim 6 wherein the intensity of said write beam is spatially varied and operative to cause a two-dimensional charge pattern to be stored at the interface of said photo-receptor and said layer of electro-optic material, and whereby said read beam is of substantially uniform spatial intensity and when directed onto said last mentioned interface will cause light reflected therefrom to project an image of said two-dimensional charge pattern.

8. An electro-optic attenuated total reflection modulator apparatus as recited in any of claims 1–7 wherein said layer of electro-optic material is of a poled organic material having a noncentrosymmetric structure and exhibits a linear electro-optic response.

9. An electro-optic attenuated total reflection modulator apparatus as recited in any of claims 1–7 wherein said electro-optic film is an organic material.

10. A method of modulating a beam of light incident on a semiconductor substrate having a layer of electro-optic material affixed to a planar surface thereof with a metal layer affixed to the opposite side of said layer of electro-optic material, whereby surface plasmons are produced due to the electro optic material-to-metallic electrode interface, comprising the steps of:
    causing said incident light beam to engage said semiconductor substrate such that it passes therethrough and intercepts the interface between said semiconductor substrate and said electro-optic layer at a predetermined angle such that the photons of the incoming beam are phase-matched with the surface plasmons on the electro-optic material-to-metal layer interface; and
    applying an electric field across said layer of electro-optic material to alter the reflective characteristics of said last mentioned interface.

11. A method as recited in claim 10 wherein said electric field is variably applied across said layer to modulate the intensity of the light beam reflected from said electro-optic material-to-metal layer interface.

12. A method as recited in claim 11 wherein said semiconductor substrate is a photo-receptor and said incident light beam is alternately a write beam, the intensity of which is spatially varied, and a read beam the spatial intensity of which is substantially uniform.

* * * * *

UNITED STATES PATENT AND TRADEMARK OFFICE
CERTIFICATE OF CORRECTION

PATENT NO. : 5,155,617
DATED : October 13, 1992
INVENTOR(S) : Solgaard et al.

It is certified that error appears in the above—identified patent and that said Letters Patent is hereby corrected as shown below:

On the Title page
Following the title, before "BACKGROUND OF THE INVENTION", insert:

"This invention was made with Government support under contract N00014-84-K-0327 awarded by the Office of Naval Research and contract DAAL03-88-K-0120 awarded by the Army Research Office. The Government has certain rights in this invention."

Signed and Sealed this

Ninth Day of November, 1993

Attest:

BRUCE LEHMAN

*Attesting Officer*      *Commissioner of Patents and Trademarks*